(12) United States Patent
Bitman et al.

(10) Patent No.: US 8,384,976 B2
(45) Date of Patent: Feb. 26, 2013

(54) FLUID DISPLAY DEVICE HAVING A CENTRAL RESERVOIR

(75) Inventors: Andriy Bitman, Dortmund (DE); Juergen Rawert, Neuss (DE)

(73) Assignee: Advanced Display Technology AG, Appenzell (CH)

( * ) Notice: Subject to any disclaimer, the term of this patent is extended or adjusted under 35 U.S.C. 154(b) by 109 days.

(21) Appl. No.: 12/737,738

(22) PCT Filed: Aug. 6, 2009

(86) PCT No.: PCT/EP2009/005693
§ 371 (c)(1),
(2), (4) Date: Mar. 23, 2011

(87) PCT Pub. No.: WO2010/020348
PCT Pub. Date: Feb. 25, 2010

(65) Prior Publication Data
US 2011/0170165 A1    Jul. 14, 2011

(30) Foreign Application Priority Data
Aug. 20, 2008    (DE) .......................... 10 2008 038 458

(51) Int. Cl.
*G02B 26/02*    (2006.01)
(52) U.S. Cl. ...................................................... 359/228
(58) Field of Classification Search .................. 359/290, 359/245, 247, 238, 495, 497, 665, 228, 237, 359/297; 345/105, 107, 84; 362/96, 101; 40/406–408, 412, 422, 439, 477; 368/65, 76, 294
See application file for complete search history.

(56) References Cited

U.S. PATENT DOCUMENTS

| | | | |
|---|---|---|---|
| 3,566,172 A | 2/1971 | Taylor et al. | |
| 4,558,314 A | 12/1985 | Fooshee | |
| 5,617,657 A | 4/1997 | Kahn | |
| 5,808,593 A | 9/1998 | Sheridon | |
| 6,120,588 A | 9/2000 | Jacobson | |
| 7,304,786 B2 | 12/2007 | Hagood et al. | |
| 7,307,672 B2 | 12/2007 | Feenstra et al. | |
| 7,646,525 B2 * | 1/2010 | Cheng et al. | 359/245 |
| 7,839,555 B2 | 11/2010 | Nakano et al. | |
| 8,223,426 B2 * | 7/2012 | Dean et al. | 359/316 |
| 2009/0046143 A1 | 2/2009 | Hiddink et al. | |

FOREIGN PATENT DOCUMENTS

| | | |
|---|---|---|
| WO | WO 03/071335 A2 | 8/2003 |
| WO | WO 2007/064142 A1 | 6/2007 |

* cited by examiner

*Primary Examiner* — Tuyen Tra
(74) *Attorney, Agent, or Firm* — Marshall & Melhorn, LLC

(57) ABSTRACT

The invention relates to a display device (1) based on the use of fluids for visualizing information. In order to ensure simple exchangeability of fluids, the invention provides a central fluid reservoir (6) in combination with a fluid display device (1) of any desired design. For this purpose, the central fluid reservoir (6) is coupled to the fluid display elements, which can be refilled with the colored fluid.

5 Claims, 1 Drawing Sheet

FLUID DISPLAY DEVICE HAVING A CENTRAL RESERVOIR

BACKGROUND OF THE INVENTION

The invention relates to the field of display devices for reproducing optical information. In particular, the invention relates to display devices which are based on the use of liquids for visualization of information.

From the prior art there is known an almost overwhelming variety of display devices serving the reproduction of optical information, such as e.g. text, still images or even moving images (videos). While a large proportion of these display devices in particular serves to reproduce colored and quickly varying information, solutions also exist which focus on the reproduction of more static and optionally monochrome information.

As an example for such display devices, reference is made to the technology of "electronic paper" developed by the company E Ink (Cambridge, Mass./USA; www.eink.com). The document U.S. Pat. No. 6,120,588 ("Electronically addressable microencapsulated ink and display thereof") is mentioned in this respect. Herein, a plurality of tiny globules is used which can be oriented in an electrical field and which are, for example, colored in white and black in equal share. By specific application of certain display areas with a corresponding electrical field, these areas appear to be colored, whereas other areas appear uncolored. To enhance contrast, an opposed electrical field can be applied to the remaining areas. In particular advantageous is the fact that such devices can be operated with low power, however, they offer slow reaction times and moreover the disadvantage that only a few colors can be displayed.

A different principle is for example disclosed in document U.S. Pat. No. 7,304,786 owned by the company Liquavista (NL). The method described herein is based on use of colored liquids, more specifically of a two phase mixture made up of colored liquid (oil) and a carrier liquid (water). Switching of a single image dot ("pixel") is carried out by means of the effect of electrowetting. By means of this effect, the shape of the oil droplet inducing the color impression can be changed. However, the amount of colored liquid present in a respective image dot is constant and can only be modified with respect to its shape. By utilizing the effect of electrowetting, energy input can be dramatically lowered, since power needed therefore is comparatively low. In a rest position, the colored liquid is uniformly spread over the area of an image dot, without supplying power, resulting to a correspondingly fully covered, colored image dot. Due to the used liquids, however, such display devices are suitable only for operation at normal ambient temperatures. Furthermore, the pixels merely include one single color, so that display of plural different colors can only be achieved by means of a close arrangement of differently colored "subpixels" and use of optical fusion thereof to perceive one pixel. Aging finally leads to undesired degradation after a while which cannot be remedied, since due to the fixed volume of colored liquid of an image dot no exchange of degraded liquid is possible.

Such fluidic devices which are based on the use of colored liquids often include single display elements ("pixel") consisting of two chambers, one of them serving for display, whereas the other one is used as a reservoir, if the corresponding pixel is not being displayed. These constructions are both complex and error-prone. A further disadvantage is seen in the fact that such two chamber solutions comprise a respective higher footprint, unless the chambers are respectively underlying the corresponding image dots, which in turn leads to fluidically complex constructions.

U.S. Pat. No. 3,566,172 A discloses a display device wherein information to be displayed is represented by means of a liquid and wherein a plurality of display elements is fluidically connected to a common liquid reservoir. A display liquid is delivered to or from the driven display element by means of at least one pump as well as valves.

WO 03/071335 A2 discloses a display device wherein with the aid of the effect of electrowetting the surface geometry of a liquid droplet can be manipulated such that the focus of a liquid droplet acting as a lens can be adjusted as a result of the modification of geometry.

SUMMARY OF THE INVENTION

It is therefore the object of the invention to provide a device which overcomes the disadvantages of the prior art. In particular, it is desirable to provide the possibility to exchange exhausted, i.e. degraded in color, liquid to ensure a permanent reproduction of the original colors. Moreover, it is desirable to realize a display device of the generic type in a manner which is as space saving as possible and such that it can be manufactured with low effort.

This object is solved by the device proposed in claim 1. Correspondingly, a central liquid reservoir is provided which is used in conjunction with a fluidic display device of any construction. The central liquid reservoir thereby is coupled to fluidic display elements which can be filled with the colored liquid.

Further preferred embodiments can be found in the dependent claims as well as in the detailed description below and in the exemplary figure.

DETAILED DESCRIPTION OF THE INVENTION

Figure 1:
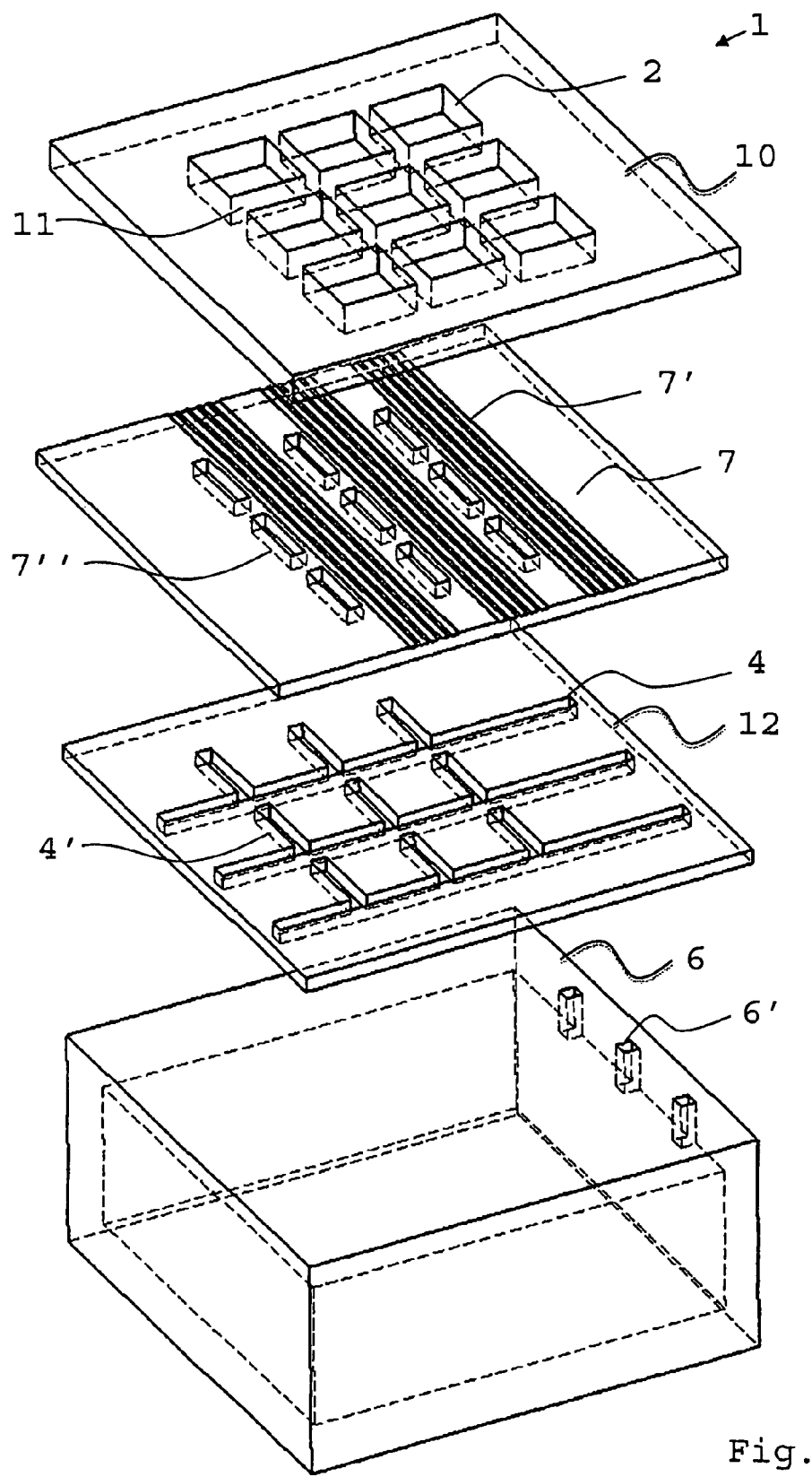
FIG. 1 shows an arrangement of a central liquid reservoir according to the invention in conjunction with a fluidic display device.

As intended, the invention is used in conjunction with a fluidic display device of any construction by use of the effect of electrowetting. Such a fluidic display device thereby includes generally at least one display liquid for displaying information, wherein the display liquid is in most cases colored, may, however also be uncolored, so that for example by means modifying the refractive indices or the reflection characteristics of the under- or background which is wet by the display liquid, a modification of the optical properties of the respective image dot can be achieved. Further, such a fluidic display device includes a plurality of display elements having cavities for receiving the display liquid. Each cavity thereby forms a closed or at least distinguishable volume which can accept display liquid and thereby determines and influences the appearance of the image dot.

According to the invention, it is provided thereby that at least one central liquid reservoir is provided and that at least two cavities of the display elements are fluidically connected with the same central liquid reservoir. Fluidically connected in the sense of the invention means that a display liquid which is within the central liquid reservoir can flow into all cavities of the display elements connected to the central liquid reservoir. It can be set aside whether optionally further elements necessary for operating the fluidic display device, such as valves, pumps or the like, are arranged in the fluidic path between central liquid reservoir and cavities and can block it, as intended, temporarily. It is however essential that the respective display elements respectively do not have a liquid reservoir which exclusively serves to supply a single display element.

According to the invention, the fluidic display device is configured in plural layers, including
  a chamber layer comprising cavities with partitions;
  an electrode carrier layer having strip shaped electrodes and passages; and
  a main duct layer having main ducts and transverse ducts; wherein
  said central liquid reservoir comprises a number of central interfaces corresponding to the number of main ducts;
  said chamber layer is arranged above said electrode carrier layer and said main duct layer is located below the electrode carrier layer and said central liquid reservoir is located below said main duct layer;
  said transverse ducts are arranged to adjoin the passages;
  at one end of said main ducts, an interface to said central liquid reservoir is located and the central interfaces are arranged such that they adjoin the interfaces of the main ducts; and
  said main ducts extend perpendicularly to the main dimensional direction of said strip-shaped electrodes and are fluidically connected with exactly one of the cavities associated with each electrode strip.

It is thereby in particular preferred that not only some but all cavities of the display elements are flui-dically connected to the same central liquid reservoir. In other words, the fluidic display device comprises only one single central liquid reservoir from which all display elements are fed or into which the display elements give excessive display liquid, respectively.

In particular in multi-colored fluidic display devices, a respective number of display liquids is also included. Therefore, it is preferably provided in this case that a respective central liquid reservoir is provided for each display liquid. Each central liquid reservoir thereby contains a display liquid and is connected with corresponding cavities designated for respective colors, wherein the display elements in this case can, for example, be arranged in multilayers or can be combined to "subpixels".

Within the scope of fluidic display devices based according to the invention on the use of the effect of electrowetting or at least integrate the same, the central liquid reservoir may contain both the display liquid and an optional carrier liquid. For this purpose, different central liquid reservoirs may be provided, it is however also possible that one central liquid reservoir is sufficient for both liquids, as long as they do not mix and inlets or outlets, respectively, are arranged such that they also do not cause mixing. For example, an oil containing color display liquid may swim in the upper region of a central liquid reservoir on an aqueous carrier liquid without necessity of a partition between said liquids in the central liquid reservoir.

It is further preferred that a fluidic display device comprising a central liquid reservoir furthermore includes at least one means for pressure equalization of the cavity of the display elements. Without such means, a subpressure will built up upon removal of display liquid from the central liquid reservoir, so that an opposing, correspondingly high feeding pressure must be built up. Similarly, an overpressure builds up during filling of the central liquid reservoir. This problem can be prevented by pressure equalization which can be achieved both by a connection with the environment and, preferably, by a closed circuit.

Principally, the central liquid reservoir may be arranged at any location of the fluidic display device. According to a preferred embodiment, however, the central liquid reservoir is arranged such that it is covered by the display elements. In other words, the central liquid reservoir is off the direction of a viewer on the other side of the display elements. In this way, a particularly space saving configuration and furthermore a respective short fluidic path between central liquid reservoir and display elements are ensured, wherein each display elements comprises its own connecting duct to the central liquid reservoir.

Furthermore, the central liquid reservoir according to the invention further includes central interfaces for exchanging the display liquid. In this way, it is in particular preferably possible to exchange the entire display liquid, either, because it is subjected to chemical modification in the course of time which leads to a modification of the color impression, or because a differently colored display liquid has been selected. Finally, it can be adequate for purposes of maintenance to flush the display elements with a corresponding cleaning liquid and, thereafter, to fill in the original display liquid into the central liquid reservoir.

According to another embodiment, it is provided to configure said central liquid reservoir to be removable from said fluidic display device. In this way, it is in particular easily possible to exchange the respective display liquid, since only the respective central liquid reservoir must be removed and substituted with a desired other central liquid reservoir. It goes without saying that fluidic interfaces which are known from the prior art as well as optionally locking mechanisms etc. must be provided.

It can be in particular preferable to combine a plurality of display elements to form a "tile". Thereby, each tile includes at least one own central liquid reservoir or plural tiles include all together at least one own central liquid reservoir. It may also be provided that all tiles include at least one own central liquid reservoir. Therefore, such a tile represents a unit which can be easily handled and exchanged, which may include, depending on the size, one or more own central liquid reservoirs or may be coupled, together with further tiles, to one or more higher-ranking central liquid reservoirs. Also hybrids are possible in which e.g. each tile includes its own central liquid reservoirs with colored display liquid, but plural or all tiles are coupled with a central liquid reservoir for cleaning liquid.

The invention allows to supply a plurality of display elements of a fluidic display device with display liquid, or receive excessive display liquid, respectively, in a space saving manner. Depending on the embodiment, the fluidic paths are very short. When using means for pressure equalization, the pressure within the central liquid reservoir remains always constant, so that the feeding rates of corresponding feeding mechanisms do not need any adjustment. By centrally supplying a plurality of display elements, it is easily possible to exchange the corresponding display liquid permanently or temporarily, to replace it e.g. with a cleaning liquid.

It is clear that depending on the concrete configuration of the device also hybrids and modifications which are not explicitly described, are conceivable without deviation from the basic idea of the invention.

FIG. 1 shows as an example an arrangement of a central liquid reservoir 6 according to the invention in conjunction with a fluidic display device 1.

In the represented embodiment, fluidic display device 1 is composed of plural layers. In a chamber layer 10, cavities 2 having partitions 11 are located. Chamber layer 10 is arranged above an electrode carrier layer with electrodes 7' which are illustrated as strip-shaped her, and passages 7". A main duct layer 12 is arranged below electrode carrier layer 7. It includes main ducts 4 as well as transverse ducts 4' which are arranged such that they adjoin passages 7". At the end of the main ducts represented on the right hand side in the figure, interfaces to central liquid reservoir 6 are located which is arranged below main duct layer 12. The reservoir in turn includes a respective number of central interfaces 6' which are arranged so that they adjoin the interfaces of the main ducts 4.

Not represented, but optionally present are respective feeding mechanisms, valves and the like as well as electrical connections which are necessary for operating the fluidic display device based on the effect of electrowetting which is as an example represented here. Also not represented are optionally provided cover or bottom layers, a means for pressure equalization as well as further elements which are not essential to illustrate the invention.

The invention claimed is:

1. A fluidic display device having a plurality of display elements for displaying information by use of the effect of electrowetting, including
    at least one display liquid for displaying information;
    a chamber layer comprising cavities having partitions;
    an electrode carrier layer having strip-shaped electrodes and passages;
    a main duct layer having main ducts and transverse ducts; and
    a central liquid reservoir for providing said at least one display liquid comprising a number of central interfaces corresponding to the number of main ducts; wherein
    said chamber layer is arranged above said electrode carrier layer and said main duct layer is located below said electrode carrier layer and said central liquid reservoir is located below said main duct layer;
    said transverse ducts are arranged such that they adjoin said passages;
    an interface to said central liquid reservoir is located at one end of said main ducts, and said central interfaces are arranged such that they adjoin the interfaces of said main ducts; and
    said main ducts extend perpendicularly to the main dimensional direction of said strip-shaped electrodes and are fluidically connected with exactly one of said cavities associated with each of said strip-shaped electrodes.

2. The fluidic display device of claim 1, further comprising a plurality of display liquids and a plurality of central liquid reservoirs, wherein one of said central liquid reservoirs is respectively provided for each of said display liquids.

3. The fluidic display device of claim 1, wherein said central liquid reservoir is arranged such that it is covered by said display elements of the fluidic display device.

4. The fluidic display device of claim 1, wherein said central liquid reservoir is configured to be removable from said fluidic display device.

5. The fluidic display device of claim 1, wherein said plurality of display elements are combined to form a tile, wherein said tile includes at least one own central liquid reservoir and wherein a plurality of said tiles together include at least one own central liquid reservoir or wherein all said tiles include at least one own central liquid reservoir.

\* \* \* \* \*

UNITED STATES PATENT AND TRADEMARK OFFICE
CERTIFICATE OF CORRECTION

PATENT NO. : 8,384,976 B2  Page 1 of 1
APPLICATION NO. : 12/737738
DATED : February 26, 2013
INVENTOR(S) : Bitman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 140 days.

Signed and Sealed this
First Day of September, 2015

Michelle K. Lee
*Director of the United States Patent and Trademark Office*